Patented July 23, 1940

2,208,641

UNITED STATES PATENT OFFICE 2,208,641

SOLUBLE SULPHANILIC ACID AMIDE DERIVATIVES

Fritz Meyer, Staten Island, N. Y.

No Drawing. Application July 28, 1938,
Serial No. 221,836

3 Claims. (Cl. 260—211)

This invention relates to methods for obtaining easily soluble products from difficultly soluble therapeutic agents, and to products obtained by these methods. It more particularly relates to sulphanilic acid amides and to methods whereby such compounds are reacted with certain hydroxy compounds, to yield soluble compounds which have far broader therapeutic applications than sulphanilic acid amide compounds heretofore available.

In a copending application Serial No. 175,564 I have described, jointly with another, certain methods for making poly hydroxy alkyl amino sulphonamides having advantageous properties for therapeutic applications. The present invention is an improvement upon the processes and products therein disclosed.

The development of sulphanilic acid amide compounds in recent years as therapeutic agents for treatment of bacterial disease has been seriously hampered by the fact that these compounds are practically insoluble in solvents which may safely be introduced into the human body. In the above noted copending application it is proposed to resolve this difficulty by reaction of sulphanilic acid amides with certain poly hydroxy alkyl compounds, whereby compounds are obtained which retain all the advantageous therapeutic properties of the sulphanilic acid amide compounds and in addition are easily soluble in such solvents as water, physiological salt solution and serum.

I have now discovered that certain modifications of the process set forth in that application have the effect of rendering the process simpler and easier to operate, and result in more stable and less toxic products. A further advantage of my present invention lies in the fact that according to my present process, the reaction is easily and dependably reproducible, that is, the course of the reaction appears not to be materially affected by slight variations in composition of the original reacting components.

I obtain my soluble sulphanilic acid amide compounds by reaction of the suitable amide with a poly hydroxy alkyl compound preferably a sugar, such as an aldose. Of such compounds I have found particularly effective those aldoses having an abnormal ether linkage, that is an ether linkage other than 1—4. Some of such aldoses which will yield a soluble compound when reacted with sulphanilic acid amide are the monoses, galactose, xylose, glucosan, levoglucosan, and the like, or such bioses as lactose and maltose.

According to my present invention I have found that the reaction may be completed in a very short time, for instance, about 30 minutes to one hour, by heating the reaction components in a closed vessel under pressure to a temperature preferably above the boiling point of the solvent used, but below the decomposition temperature of the reaction components at the pressure applied. As a solvent for this reaction I prefer to use an organic water-miscible inert liquid like the lower aliphatic alcohols or dioxan. Because of the convenience of its boiling point and its easy availability, I have found it preferable to use ethyl alcohol, though methyl alcohol or higher aliphatic alcohols, for example, butyl, propyl, or mixtures thereof, may be used.

I have found that the presence of a small amount of water in the reaction mixture tends to produce a more soluble and somewhat less toxic product. Since the definite amount of water present does not appear to be critical, it may be provided by use of 95% methyl alcohol as a solvent, or by use of steam in the pressure vessel, or by actual addition of water in an amount up to say 10% of the reaction mixture.

I have also discovered that small amounts of organic alcohol-miscible solvents having a boiling point above the reaction temperature may advantageously be added to the extent of, for example, .1% to about 5% of the weight of the reaction components. The products obtained in such reactions, the method of which will be more specifically stated in the examples below, are particularly useful. The products are easily soluble and have no tendency to deteriorate on standing and further do not appear to depend for their stability and solubility upon the precise composition of the components of the original reaction mixture. Examples of such compounds are for instance glycols like ethylene, propylene, or butylene glycols, cyclohexanol and particularly glycerol. Glycerol is preferred as any traces thereof possibly left in the final product are perfectly harmless.

The necessary pressure for the reaction, though comparatively small, may be obtained by introducing neutral gases, like carbon dioxide, nitrogen or preferably, steam. In most cases it is sufficient to use live steam of say 10 to 15 lbs. for simultaneously heating and for generating the pressure in the reaction vessel. As above noted, steam has the added advantage of providing water in the reaction, thus improving the product.

As an example of my improved process the following may be stated, though it is to be understood that the invention is in no way to be limited thereby:

To obtain a product of high purity, having optimum properties of solubility and absence of toxicity, the following procedure is suggested.

I. 5 gms. sulphanilic acid amide, 5.5 gms. galactose (M. P. 163–5° C.), and .25 gms. glycerol were treated in 85 cc. of 95% ethyl alcohol in a closed vessel under 10 lbs. of steam for 30 minutes. A colorless to yellowish syrup was obtained having approximately the consistency of honey.

This reaction mixture was then mixed with 1 to 2 cc. of pyridine and placed on a water bath at about 85° C. for 10 minutes. The whole was then combined with about 150 cc. of ethyl alcohol whereupon a white cloudiness appeared. This solution was kept at 0° C. for 24 hours, at the end of which time a fine white apparently microcrystalline precipitate had settled and the supernatant alcohol had assumed a yellowish tinge, depending upon the color of the original syrupy reaction product.

The precipitate was washed in cold alcohol and dried in a current of warm air in 3 to 4 hours. The yield is about 75 to 80% of fine white crystalline substance, very soluble in warm or cold water. The solutions appear to be relatively permanent. The product, when used therapeutically is substantially lacking in toxicity.

As stated heretofore, the syrupy product is usually of sufficient purity and may be dissolved directly for ordinary purposes. The purity of this syrupy product is dependent upon the length of time the reaction mixture is kept in the steam bath. Less than 20 minutes may result in incomplete reaction whereas at 40 minutes a slight brownish appearance becomes evident.

Solutions in water up to concentrations of the order of 50% may be had with products obtained by following the procedure set forth in the above example using appropriate amounts of sulphanyl p amino benzene sulphonic acid amide, sometimes called disulphanilamide, galactose and glycerine. These solutions have useful therapeutic applications.

II. 5.5 gms. of sulphanilamide, 5 gms. of xylose, .25 gms. of glycerol were treated under pressure of live steam between 10 and 15 lbs. in 85 gms. of 95% ethyl alcohol for 20 minutes. A slightly turbid reaction mixture was obtained. The reaction product may be crystallized with alcohol and purified by recrystallization therefrom. A compound of extremely fine microcrystalline formation is obtained. If the original reaction mixture contains somewhat less solvent a syrupy reaction product is obtained which, however, may be recrystallized in the manner indicated and yields an equally useful product.

It is not necessary, however, to recrystallize the product in order to render it useful. The reaction mixture above described may be dissolved directly in water, salt solution, or serum, or mixtures thereof.

While the products obtained are chemically similar in many ways to the products described in the above noted application, Serial No. 175,564, their properties indicate that they are hydrates of the polyhydroxy alkyl amino sulphonamide compounds. This is strongly indicated by the fact that by careful and extended drying processes, products of this invention may be obtained which have a melting point very close to the products described in the said copending application. I have been unable, however, by following the process of that application to obtain the hydrated products herein disclosed. I have made an extended investigation to determine the exact composition of the compounds of the present invention, and the above stated theory on hydration is my best knowledge according to the present state of my investigations.

It should be carefully noted, however, that the compounds of my present invention possess numerous distinct advantages over the compounds for the same purpose previously obtained. The reactions described in the above examples have been found to be absolutely reproducible. The presence or absence of traces of impurities in the sulphanilic acid amide or in the aldose component appear to have little if any effect upon the reaction. The products obtained, both in crystallized and uncrystallized form have been found to be extremely stable and can be kept over substantial periods of time without any change in composition.

This stability of solution is particularly noticeable in higher concentrations and as a result of this property concentrated solutions may be stored for long periods of time and only diluted to such concentrations as are actually useful for application as the necessity arises.

The products further appear to possess little, if any toxicity and accordingly are useful for all purposes for which sulphanilamide has been used heretofore. Products obtained according to these reactions when using bioses have been found useful, but monoses are preferred as compounds derived therefrom contain a higher concentration of effective therapeutic agent.

The products herein disclosed may also be used in connection with the compounds described in my copending application, Serial No. 221,835 for improvements in Serum therapy.

I claim:

1. The process which comprises the steps of heating under pressure substantially equimolecular quantities of sulphanilic acid amide and galactose with a small portion of glycerol in a large excess of ethyl alcohol, and evaporating a substantial portion of the alcohol until a slightly turbid colorless mixture is obtained.

2. The process which comprises heating under pressure in the presence of steam substantially equimolecular quantities of sulphanilic acid amide and galactose in a large excess of ethyl alcohol and evaporating a substantial portion of the alcohol until a slightly turbid colorless mixture is obtained.

3. The reaction product of sulphanilic acid amide, galactose and glycerol.

FRITZ MEYER.